United States Patent
Yang et al.

(10) Patent No.: US 8,385,742 B2
(45) Date of Patent: Feb. 26, 2013

(54) ELECTRICAL RETURN-TO-ZERO (ERZ) DRIVER CIRCUIT

(75) Inventors: Xinghua Yang, San Jose, CA (US); Paul N. Freeman, Saratoga, CA (US); Huan-Shang Tsai, Cupertino, CA (US); Alan C. Nilsson, Mountain View, CA (US); Jeffrey S. Bostak, San Martin, CA (US); Vincent G. Dominic, Dayton, OH (US); Parmijit Samra, Fremont, CA (US); James Stewart, San Mateo, CA (US)

(73) Assignee: Infinera Corporation, Sunnyvale, CA (US)

( * ) Notice: Subject to any disclaimer, the term of this patent is extended or adjusted under 35 U.S.C. 154(b) by 533 days.

(21) Appl. No.: 12/645,770

(22) Filed: Dec. 23, 2009

(65) Prior Publication Data

US 2011/0150481 A1    Jun. 23, 2011

(51) Int. Cl.
*H04J 14/02*    (2006.01)

(52) U.S. Cl. .......... 398/79; 398/162; 398/167; 375/354; 375/375

(58) Field of Classification Search ............ 398/162, 398/167, 164, 79, 82, 43, 154, 155; 375/354, 375/358, 375, 373, 376
See application file for complete search history.

(56) References Cited

U.S. PATENT DOCUMENTS

| | | | |
|---|---|---|---|
| 6,347,128 B1 * | 2/2002 | Ransijn | 375/376 |
| 7,653,169 B2 * | 1/2010 | Yamaguchi et al. | 375/376 |
| 8,238,501 B2 * | 8/2012 | Yang et al. | 375/355 |

* cited by examiner

*Primary Examiner* — M. R. Sedighian
(74) *Attorney, Agent, or Firm* — David L. Soltz

(57) ABSTRACT

Consistent with the present disclosure, clock-and-data recovery (CDR) circuitry and driver circuitry are provided on a chip that is separate from the driver circuitry, thereby reducing the amount of power consumed by the driver circuitry and simplifying system design. In one example, timing of the ERZ signals is controlled by a feedback loop that adjusts the phase of a data carrying signal relative to a clock signal, such that the phase has a desired value. Timing of the ERZ signals may thus be adjusted to minimize errors.

12 Claims, 10 Drawing Sheets

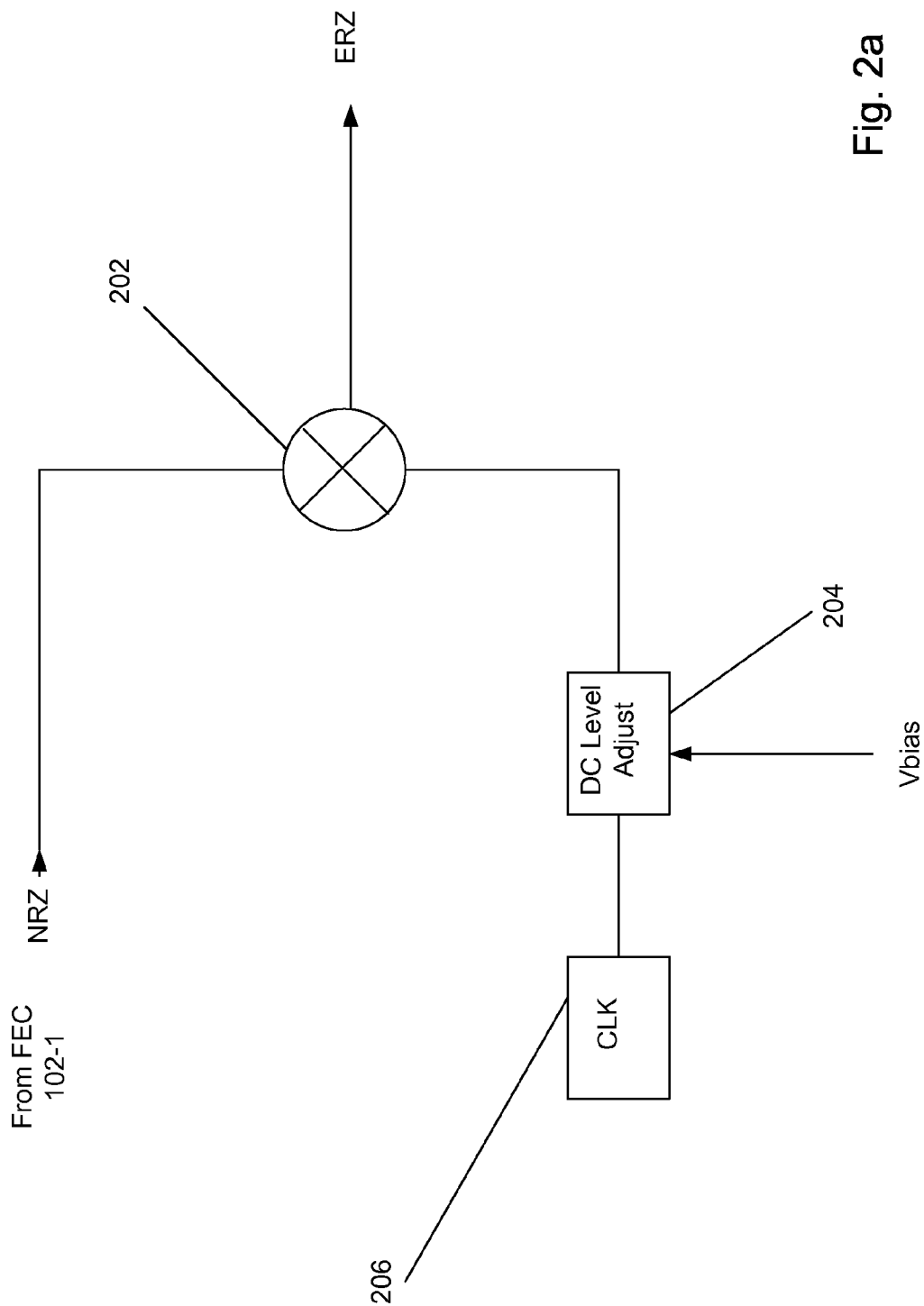

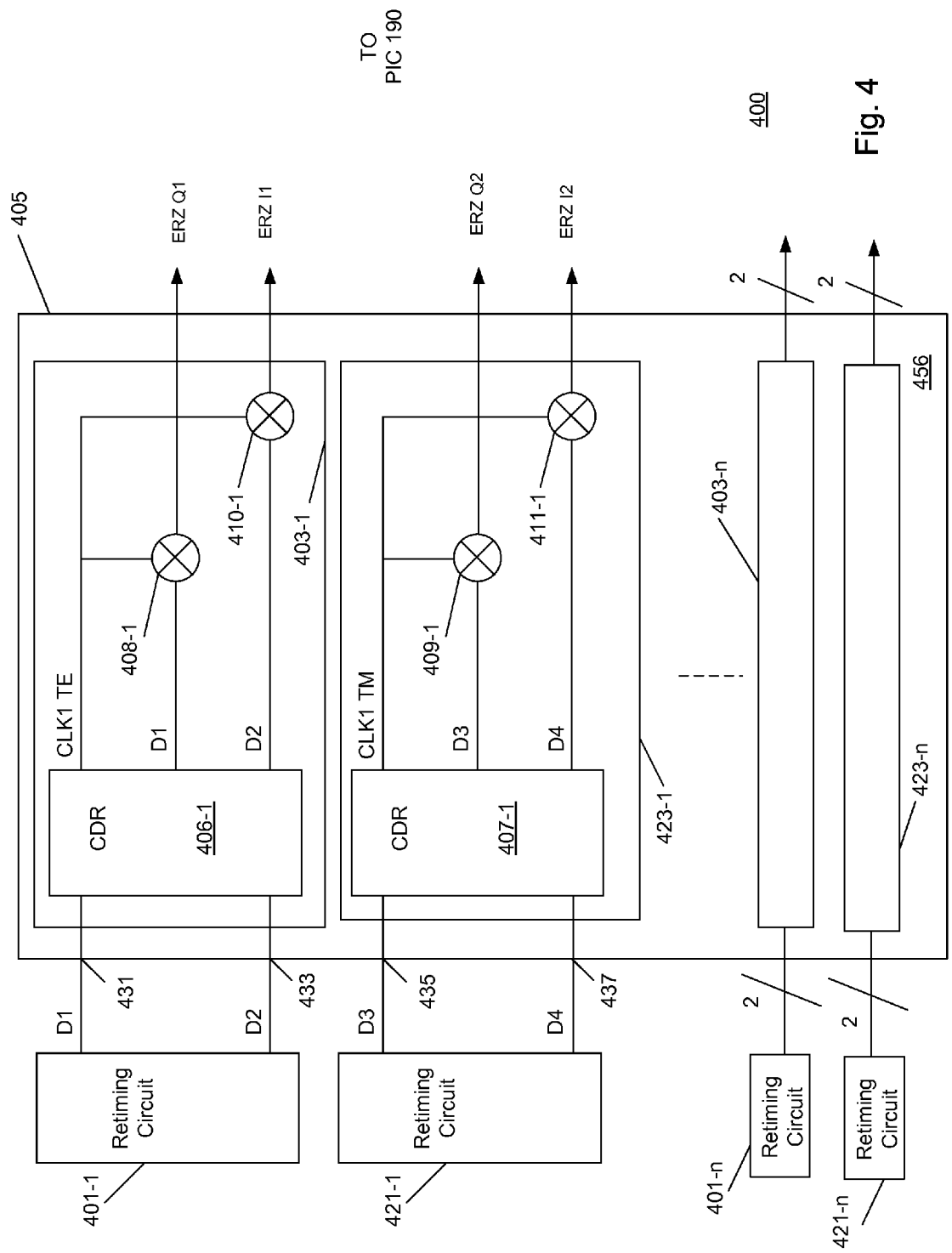

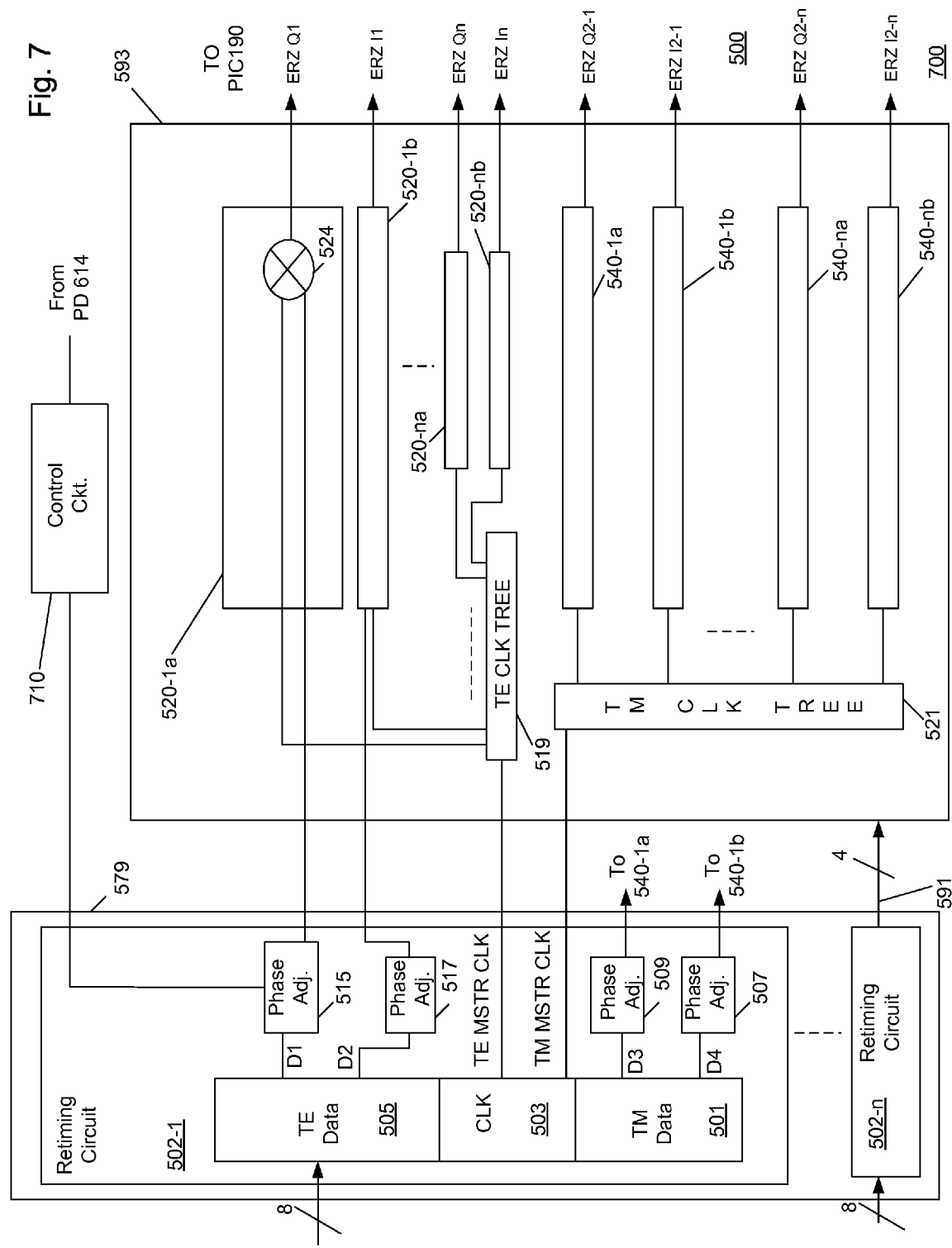

US 8,385,742 B2

ELECTRICAL RETURN-TO-ZERO (ERZ) DRIVER CIRCUIT

BACKGROUND

Wavelength division multiplexed (WDM) optical communication systems are known in which multiple optical signals, each having a different wavelengths, are combined onto a single optical fiber. Such systems typically include a laser associated with each wavelength, a modulator configured to modulate the output of the laser, and an optical combiner to combine each of the modulated outputs.

Conventionally, WDM systems have been constructed from discrete components. For example, the lasers, modulators and combiners have be packaged separately and provided on a printed circuit board. More recently, however, many WDM components have been integrated onto a single chip, also referred to a photonic integrated circuit (PIC).

In order to further increase the data rates associated with WDM systems, various modulation formats have been proposed for generating the modulated output.

One such modulation format, known as polarization multiplexed differential quadrature phase-shift keying ("Pol Mux DQPSK"), can provide higher data rates than other modulation formats. A PolMuxDOPSK signal typically includes light having first and second polarizations, such as transverse TE and transverse TM polarizations, which are modulated independently of each other. In a WDM system generating such signals, four modulators are often provided for each wavelength, such that a first modulator pair modulates light having the first polarization to have respective in-phase and quadrature components, and a second modulator pair modulates light having the second polarization with such components.

The electrical signals used to drive the modulators typically constitute a series of pulses having either a non-return-to-zero (NRZ) or (RZ) return-to-zero pulse shape. RZ signals return to a zero or low level between pulses, whereas NRZ signals do not transition to the zero level between pulses. When supplied to a modulator, the RZ modulator drive signals (or electrical RZ (ERZ) signals) generate corresponding RZ optical signals that may have improved performance compared to NRZ optical signals. Accordingly, RZ optical signals may be preferred in many applications.

As the number of modulators increases on the PIC, however, the complexity and power consumption of the ERZ signal generating circuitry also increases. Accordingly, there is a need for such circuitry that has a relatively simple design and relatively low power consumption. In addition, such circuitry should preferably have controlled timing in order to reduce errors.

SUMMARY

Consistent with the present disclosure, a communication apparatus is provided that comprises a substrate, a first input that receives a clock signal, and a second input that receives a first electrical non-return-to-zero (NRZ) signal. A first multiplier circuit is provided on the substrate, and the clock signal is distributed to the first multiplier circuit such that the first multiplier circuit multiplies the clock signal by the first electrical NRZ signal to generate a first electrical return-to-zero (ERZ) signal. A third input is also provided that receives a second electrical NRZ signal. In addition, a second multiplier circuit is provided on the substrate, and the clock signal is distributed to the second multiplier circuit such that the second multiplier circuit multiplies the clock signal by the second electrical NRZ signal to generate a second ERZ signal.

Consistent with an additional aspect of the present disclosure, a communication apparatus is provided that comprises a substrate and a clock-and-data recover (CDR) circuit, which is provided on the substrate. The CDR circuit receives an input signal and supplies a first electrical non-return-to-zero (NRZ) signal and a clock signal in response to the input signal. A first multiplier circuit is also provided on the substrate, and the clock signal is distributed to the first multiplier circuit such that the first multiplier circuit multiplies the clock signal by the first electrical NRZ signal to generate a first electrical return-to-zero (ERZ) signal. In addition, an input is provided that receives a second electrical NRZ signal. Further, a second multiplier circuit is provided on the substrate, and the clock signal is distributed to the second multiplier circuit such that the second multiplier circuit multiplies the clock signal by the second electrical NRZ signal to generate a second ERZ signal.

Consistent with a further aspect of the present disclosure, a communication apparatus is provided that comprises a phase detector configured to receive an input signal and a clock signal. The phase detector is configured to sense a difference in a first phase of the input signal and a second phase of the clock signal and output a sense signal in accordance with the difference in the first and second phases. A phase adjusting circuit is also provided that is configured to adjust the first phase in accordance with a control signal that is based on the sense signal. In addition, a multiplier circuit is provided that is configured to multiply the input signal by the clock signal to generate an output signal.

It is to be understood that both the foregoing general description and the following detailed description are exemplary and explanatory only and are not restrictive of the invention, as claimed.

The accompanying drawings, which are incorporated in and constitute a part of this specification, illustrate various embodiments of the present disclosure.

BRIEF DESCRIPTION OF THE DRAWINGS

FIG. 2a illustrates a block diagram of an ERZ signal generating circuit consistent with a further aspect of the present disclosure;

FIG. 4 illustrates a further example of a driver circuit consistent with an additional aspect of the present disclosure;

FIG. 5b illustrates an alternative feedback circuit to be included in the driver circuit shown in FIG. 5a;

FIG. 7 illustrates another example of a driver circuit consistent with the present disclosure.

DESCRIPTION OF THE EMBODIMENTS

Consistent with the present disclosure, clock-and-data recovery (CDR) circuitry and driver circuitry are provided on a chip that is separate from the driver circuitry, thereby reducing the amount of power consumed by the driver circuitry and simplifying system design. In one example, timing of the ERZ signals is controlled by a feedback loop that adjusts the phase of a data carrying signal relative to a clock signal, such that the phase has a desired value. Timing of the ERZ signals may thus be adjusted to minimize errors.

Reference will now be made in detail to the present exemplary embodiments, examples of which are illustrated in the accompanying drawings. Wherever possible, the same reference numbers will be used throughout the drawings to refer to the same or like parts.

Figure 1A:
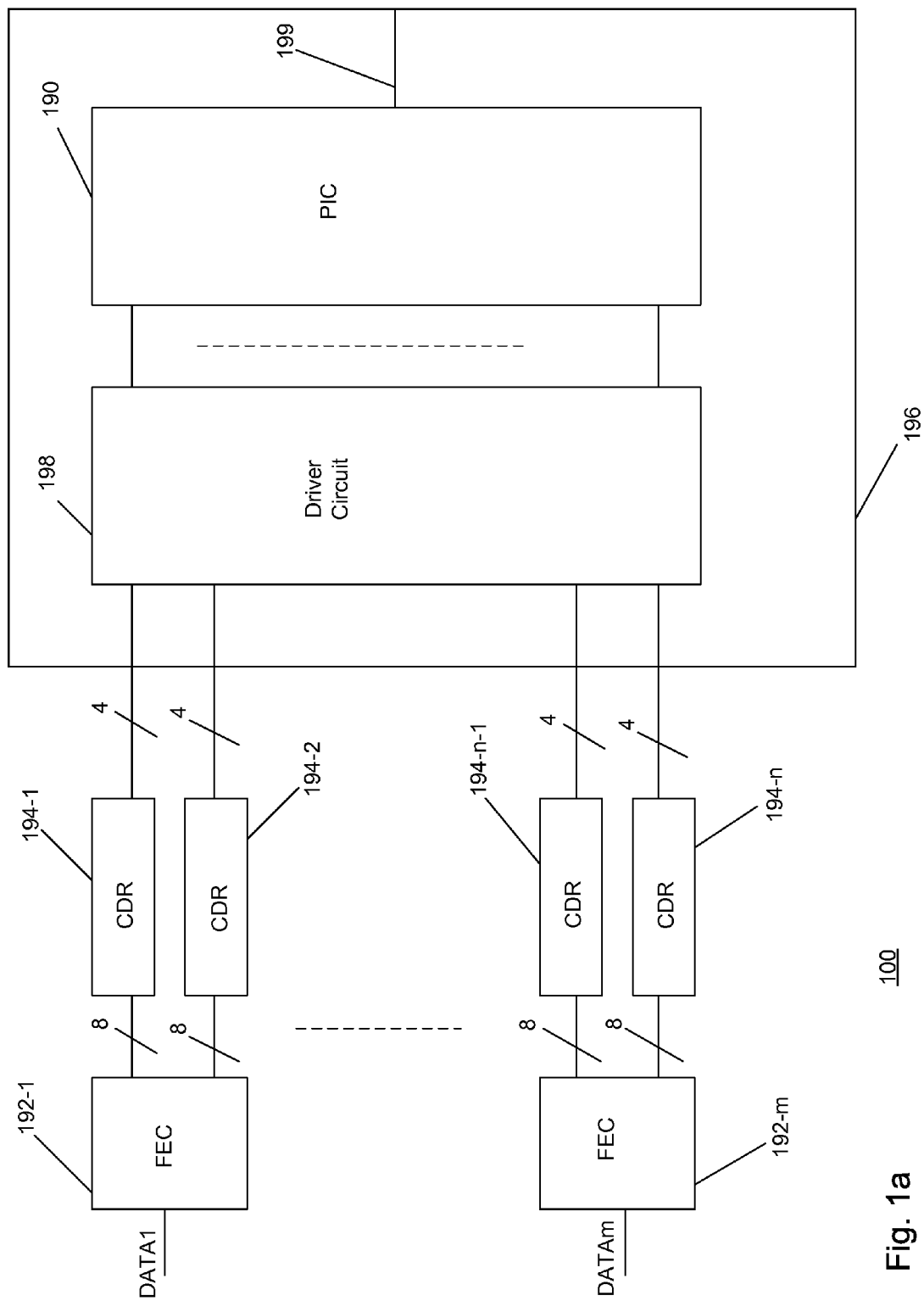
FIG. 1a is a block diagram of a transmitter consistent with an aspect of the present disclosure.

FIG. 1a illustrates an exemplary transmitter 100, which receives data DATA1 to DATAm that are supplied to corresponding forward error correction (FEC) encoder circuits 192-1 to 192-m. In one embodiment, such data is encoded by circuits 192-1 to 192-m and each of circuits 192-1 to 192-m outputs the encoded data as sixteen 5.7 Gbit/second data streams. CDR circuits 194-1 to 194-n receive corresponding groupings of eight such encoded data streams and extract clock and data signals from each data stream. As further shown in FIG. 1a each of CDR circuits 194-1 to 194-n outputs a grouping of 4 data streams, each of which may be at 11.4 Gbit/second, for example. The data streams output from CDR circuits 194-1 to 194-n are next supplied to driver circuit 198, which, in turn, generates driver signals to photonic integrated circuit 190. PIC 190 modulates a plurality of optical signals, each of which having a corresponding one of a plurality of wavelengths, in accordance with the drive signals, and combines the modulated signals onto an output 199. An example of PIC 190 is discussed in U.S. Patent Application Publication No. 20090245795, the entire contents of which are incorporated herein by reference.

Figure 1B:
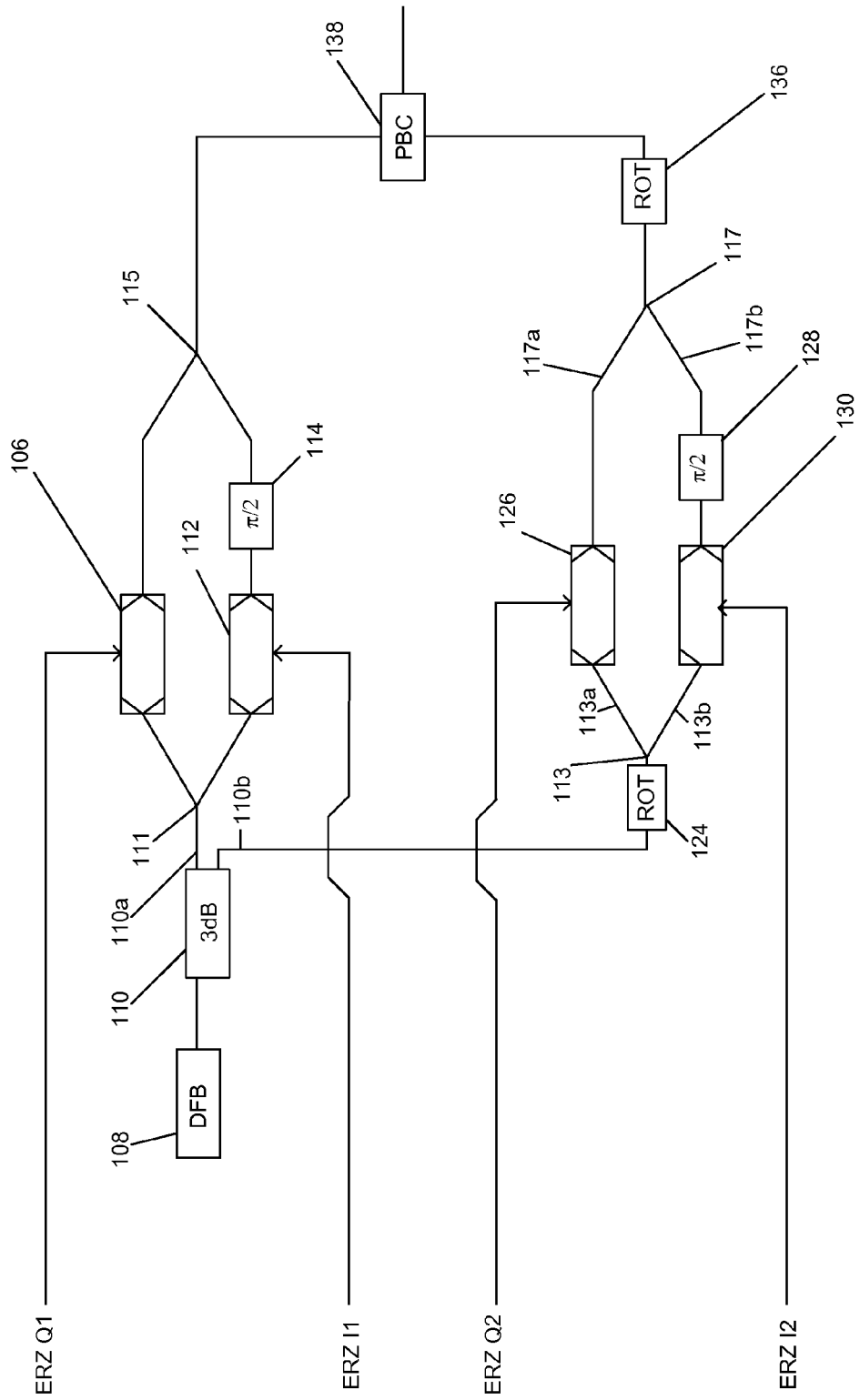
FIG. 1b illustrates an example of included in a photonic integrated circuit (PIC) consistent with an additional aspect of the present disclosure.

FIG. 1b illustrates a portion 187 of PIC 190, including modulators, such as Mach-Zehnder modulators 106, 112, 126 and 130, for supplying modulated polarized optical signals having a particular wavelength (e.g., λ1). A plurality of such portions may be provided to generate the remaining modulated optical signals output from PIC 190. Drive signals output from driver circuit 198, such as quadrature (ERZQ1) and in-phase (ERZI1) signals are supplied to and drive modulators 106 and 112, while quadrature (ERZQ2) and in-phase (ERZI2) signals are supplied to and drive modulators 126 and 130, respectively.

In the example shown in FIG. 1b, an optical source, such as a distributed feedback (DFB) laser 108 outputs continuous wave (CW) light to a 3 dB coupler 110. A first output 110a of 3 dB coupler 110 supplies a portion of the optical output to a branching portion 111 that further power splits the output from laser 108 and supplies light to modulator 106 and to modulator 112, also referred to as "nested" modulators. As noted above, drive signals ERZQ1 and ERZI1 are supplied to modulators 106 and 112, respectively.

The phase of light output from Mach-Zehnder modulator 112 may be shifted by π/2 radians by phase shifter 114 to provide the in-phase (ERZI1) component and combined (note combiner 115) with light output from Mach-Zehnder modulator 106 having the quadrature (ERZQ1) component. The combined light, which may have a TE polarization, for example, is then fed to polarization beam combiner 138. Alternatively, the in-phase and quadrature components may be reversed such that the quadrature component is phase shifted by π/2 radians relative to the in-phase component.

In addition, a second output 110b of 3 dB coupler 110 supplies an output to an optional polarization rotator 124, which directs light to branching portion 113. Alternatively, instead of rotator 124, polarization rotator 136 may be provided. Light output on lines 113a and 113b from the branching portion 113 is then modulated by modulators 126 and 130, respectively, in accordance with corresponding drive signals ERZQ2 and ERZI2, and then combined by combiner 117. The phase of light output from Mach-Zehnder modulator 130 is shifted by π/2 radians by phase shifter 128 prior to such combining. The polarization of the outputs from modulators 126 and 130 is rotated such that the outputs by rotator 136 to have a TM polarization. The combined output from comber 117 is then combined with the TE polarized signals noted above by polarization beam combiner 138.

As noted above, the drive signals supplied to the modulators in PIC 190, such as modulators 106, 112, 126, and 130, are electrical signals having a return-to-zero (RZ) signal, i.e., such signals are ERZ signals. A simplified block diagram of an exemplary ERZ signal generating circuit 200 is shown in FIG. 2a. Circuit 200 includes a clock 206 that supplies a pulse train (clock pulses) to bias-T circuit DC level adjusting circuit 204, which, as generally understood also receives a bias voltage (Vbias). Level adjusting circuit 204, in turn, outputs the clock pulses with a desired DC bias. Such clock pulses are supplied to multiplier circuit 202, along with an encoded data stream from FEC circuit 102-a, for example. The data stream may include electrical data pulses having a non-return-to-zero (NRZ) pulse shape. When such data pulses are multiplied by the clock pulses by multiplier circuit 202, the output is an ERZ signal, i.e., an electrical signal having an RZ pulse shape.

Figure 2B:
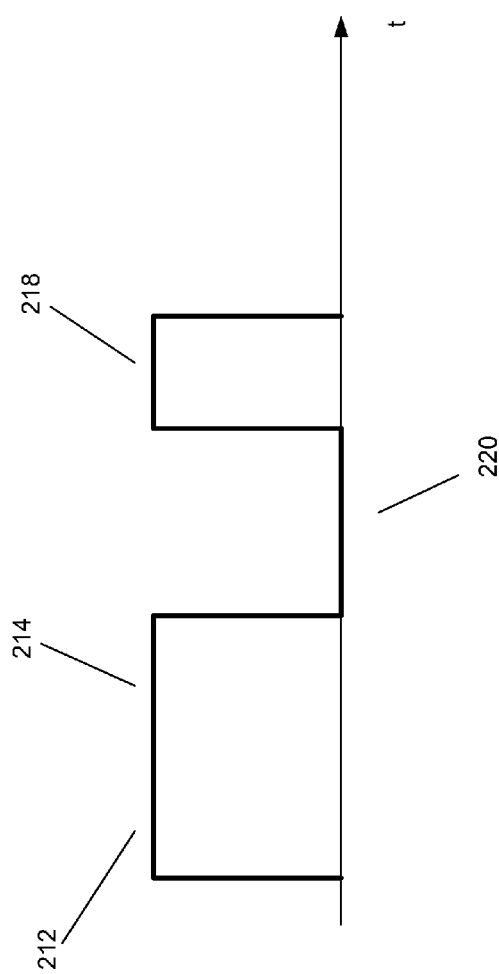
FIGS. 2b and 2c illustrate timing diagrams of NRZ and RZ signals, respectively.
Figure 2C:
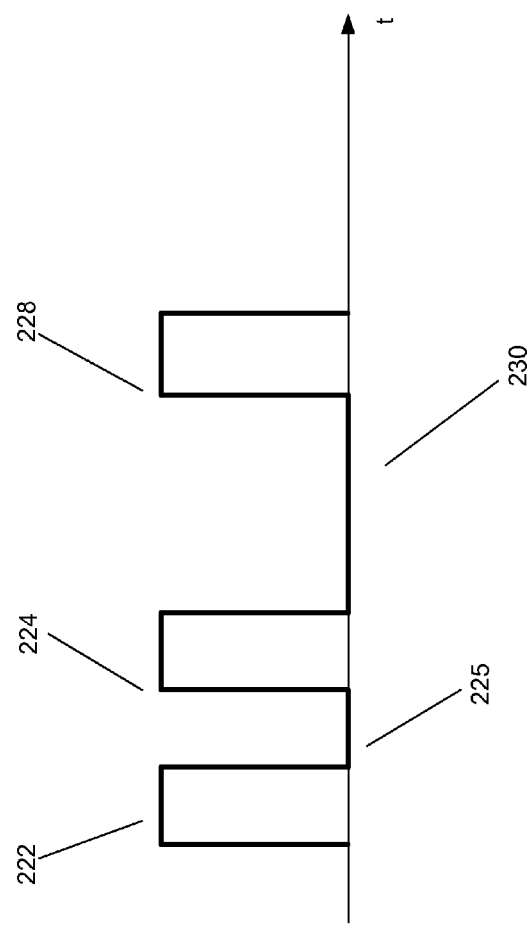

FIG. 2b illustrates a timing diagram of a series of "1", "1", "0", and "1" bit NRZ pulses 212, 214, 220, and 218, respectively. As shown in FIG. 2b, such pulses do not transmission to a low or zero level between adjacent "1" bit pulses. On the other hand, as shown in FIG. 2c, RZ signals transition to a low or zero level between adjacent "1" bits. Thus, in the example shown in FIG. 2c, pulses 222, 224, 230, and 228 corresponding to a "1", "1", "0" and "1" bits, respectively, are shown as having an RZ pulse shape because, for example, of the transition 225 to a low level between pulses 222 and 224.

Figure 3:
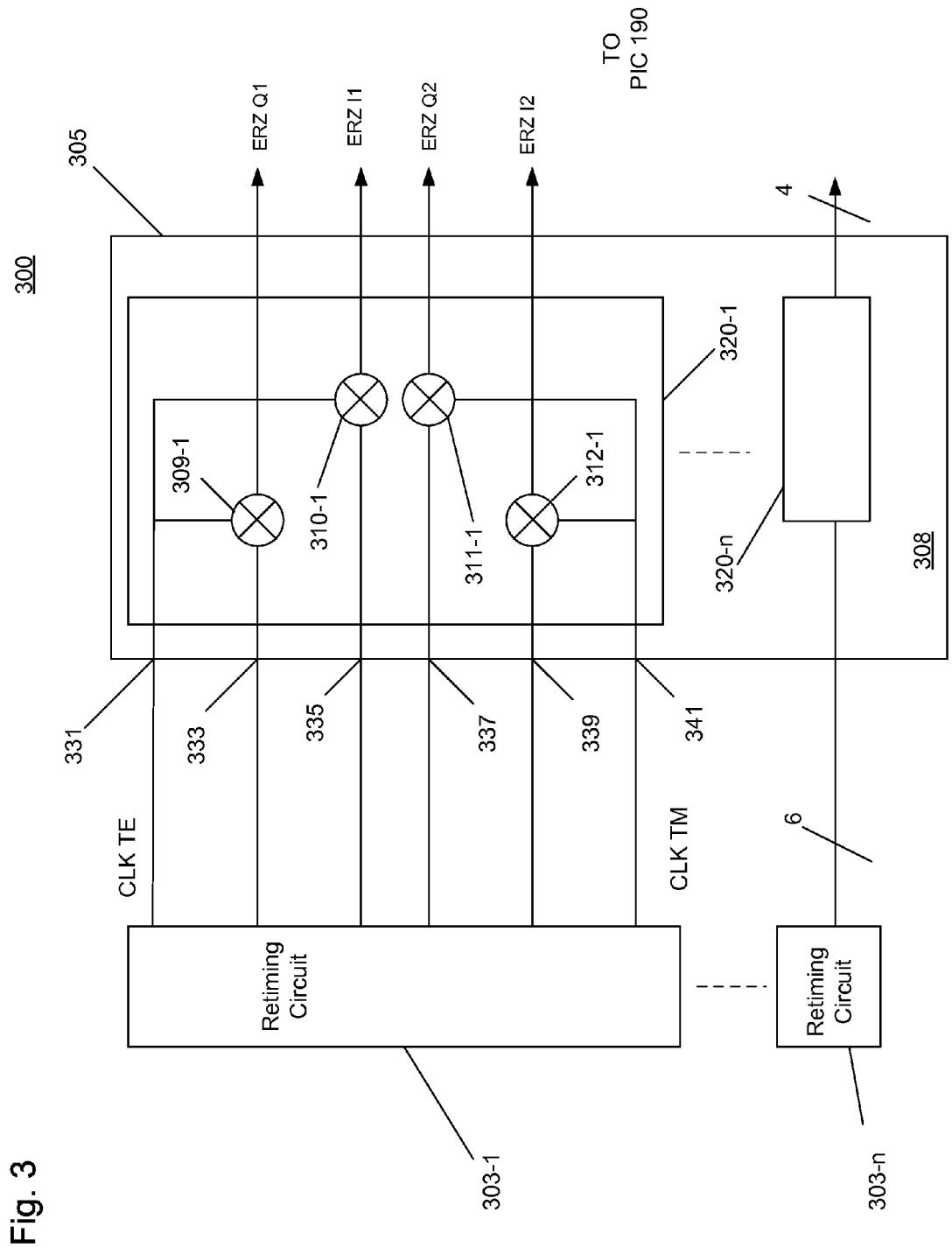
FIG. 3 illustrates an example of a driver circuit consistent with an aspect of the present disclosure.

FIG. 3 illustrates a communication apparatus or circuitry 300 for outputting ERZ drive signals. Circuitry 300 retiming circuit 303-1 (as well as retiming circuits 301-2 to 303-n that have the same or similar structure as retiming circuit 303-1 and also receive corresponding grouping of output from FEC encoder circuits 192-2 to 192-m). Retiming circuit 303-1 receives the outputs from FEC encoder circuit 192-1, and, in response to these input streams supplies two clock signals, CLK TE and CLK TM, as well as four data streams D1, D2, D3, and D4. Data streams or signals D1-D4 correspond to the four data streams output from CDR 194-1 discussed above. Each of D1, D2, D3, and D4 constitute first, second, third, and fourth electrical NRZ signals. CLK TE, D1, D2, D3, D4, and CLK TM are supplied to inputs 331, 333, 335, 337, 339, and 341, respectively, of integrated circuit (IC) 308. IC 308 includes substrate 305 upon which a plurality of driver circuits 320-1 to 320-n is provided. Driver circuit 320-1 includes multiplier circuits 309-1, 310-1, 311-1, and 312-1. It is understood that remaining driver circuit 320-2 to 320-n have a structure similar to that of driver circuit 320-1 and receive similar groupings of clock and data signals from corresponding retiming circuits 303-2 to 303-n.

As further shown in FIG. 3, CLK TE is supplied or distributed to both multiplier circuits 309-1 and 310-1, while signals D1 and D2 are fed to multiplier circuits 309-1 and 310-1, respectively. Multiplier circuit 309-1, in turn, multiplies CLK TE by D1 to generate electrical return-to-zero (ERZ) signal ERZQ1, and multiplier circuit 310-1 multiplies CLK TE by D2 to generate ERZ signal ERZI1. Similarly, clock signal CLK TM is supplied to both of multiplier circuits 311-1 and 312-1, and signals D3 and D4 are supplied to multiplier circuit 311-1 and 312-1, respectively. As a result, multiplier circuits 311-1 and 312-1 likewise output ERZ signals ERZQ2 and ERZI2, respectively. As noted above, signals ERZQ1, ERZI1, ERZQ2, and ERZI1 are supplied to and drive corresponding modulators in PIC 190, such as modulators 106 and 112 (see FIG. 1*b*) that modulate optical signals output from PIC 190 having a TE polarization; and modulators 126 and 130 that modulate optical signals output from PIC 190 having a TM polarization.

It is understood that remaining driver circuits 320-2 to **320-*n* operate in the same or similar fashion as driver circuit 320-1 to output groupings (four in each group) of ERZ signals in response to data and clock signals received from retiming circuits 303-2 to 303-*n***.

Driver circuit 320-1 may consume relatively little power, since clock-and-data-recovery circuitry is not included in IC 308 shown in FIG. 3. As the number of modulators is increased on PIC190, however, the number of drive signals correspondingly increases. Accordingly, the number of clock signals supplied to IC 308 may also increase, such that, at relatively high frequencies, such clock signals may generate crosstalk with other inputs to IC 308.

FIG. 4 illustrates another example of a communication apparatus 400 consistent with an example of the present disclosure. Communication apparatus 400 may include retiming circuits 401-1 to **401-*n* and 421-1 to 421-*n*. Retiming circuit 401-1 outputs NRZ data signals D1 and D2 in response to encoded data received from one or more of FEC encoder circuits 192-1 to 192-*m*, and retiming circuit 421-1 outputs NRZ data signals D3 and D4 in response to encoded data received from one or more of remaining ones of FEC encoder circuits 192-1 to 192-*m*. Signals D1 to D4 are supplied to integrated circuit (IC) 456 via corresponding inputs 431, 433, 435, and 437. IC 456 includes a substrate 405 having a plurality of driver circuits 403-1 to 403-*n* and 423-1 to 423-*n* provided thereon. One of these driver circuits, namely driver circuit 403-1, may receive signals D1 and D2, and another of the driver circuits, 423-1, may receive signals D3 and D4. It is understood that remaining driver circuits 403-2 to 403-*n* have the same or similar structure and operate in the same or similar manner as driver circuit 403-1, and driver circuits 423-2 to 423-*n* have the same or similar structure and operate in the same or similar manner as driver circuit 423-1**.

As further shown in FIG. 4, driver circuit 403-1 includes CDR circuit 406-1 that receive signals D1 and D2, and CDR circuit 407-1 receives signals D3 and D4. CDR circuit 406-1 extracts or generates clock signal CLKTE based on signal D1 and outputs signals D1 and D2. Clock signal CLKTE is distributed to multiplier circuit 408-1 and to multiplier 410-1. Signal D2 is also supplied to multiplier 410-1. Accordingly, multiplier circuit 408-1 multiplies CLKTE by D1 to generate ERZ signal ERZQ1. In addition, the product of CLKTE and D2 is output from multiplier circuit 410-1 as ERZ signal ERZI1.

In a similar fashion, CDR circuit 407-1 extracts or outputs clock CLKTM based on signal D3. CDR circuit 407-1 also outputs signal D3 and D4. CLKTM is distributed to multiplier circuits 409-1 and 411-1, such that multiplier circuit 409-1 multiplies clock CLKTM by signal D3 to supply ERZ signal ERZQ2, and multiplier circuit 411-1 multiplies signal D4 by clock CLKTM signal to generate ERZ signal ERZI2. As noted above, signals ERZQ1, ERZI1, ERZQ2, and ERZI2 are supplied to and drive modulators on PIC 190.

Remaining driver circuits 403-2 to **403-*n* receive data signals from corresponding retiming circuits 401-2 to 401-*n* and output groupings (two in each, for example) of ERZ drive signals in the same or similar manner as that described above in connection with driver circuit 403-1. Such ERZ drive signals may be used to modulate the TE polarized signals, for example, that are output from PIC 190. In addition, remaining driver circuits 423-2 to 423-*n* receive data signals from corresponding retiming circuits 421-2 to 421-*n* and output groupings (two in each, for example) of further ERZ drive signals in the same or similar manner as that described above in connection with driver circuit 423-1. Such further ERZ drive signals may be used to modulate the TM polarized signals, for example, that are output from PIC 190**.

An advantage associated with the driver circuits shown in FIG. 4 is that clock signals, e.g., CLKTE and CLKTM are generated locally within IC 456, and thus additional inputs or lines are not required to supply these clock signals to the driver circuits, such as 403-1. However, since CDR circuits 406-1 and 407-1 are provided in IC 456, IC 456 may generate and/or consume more power, than, for example, IC 308 discussed above in connection with FIG. 3.

Figure 5A:
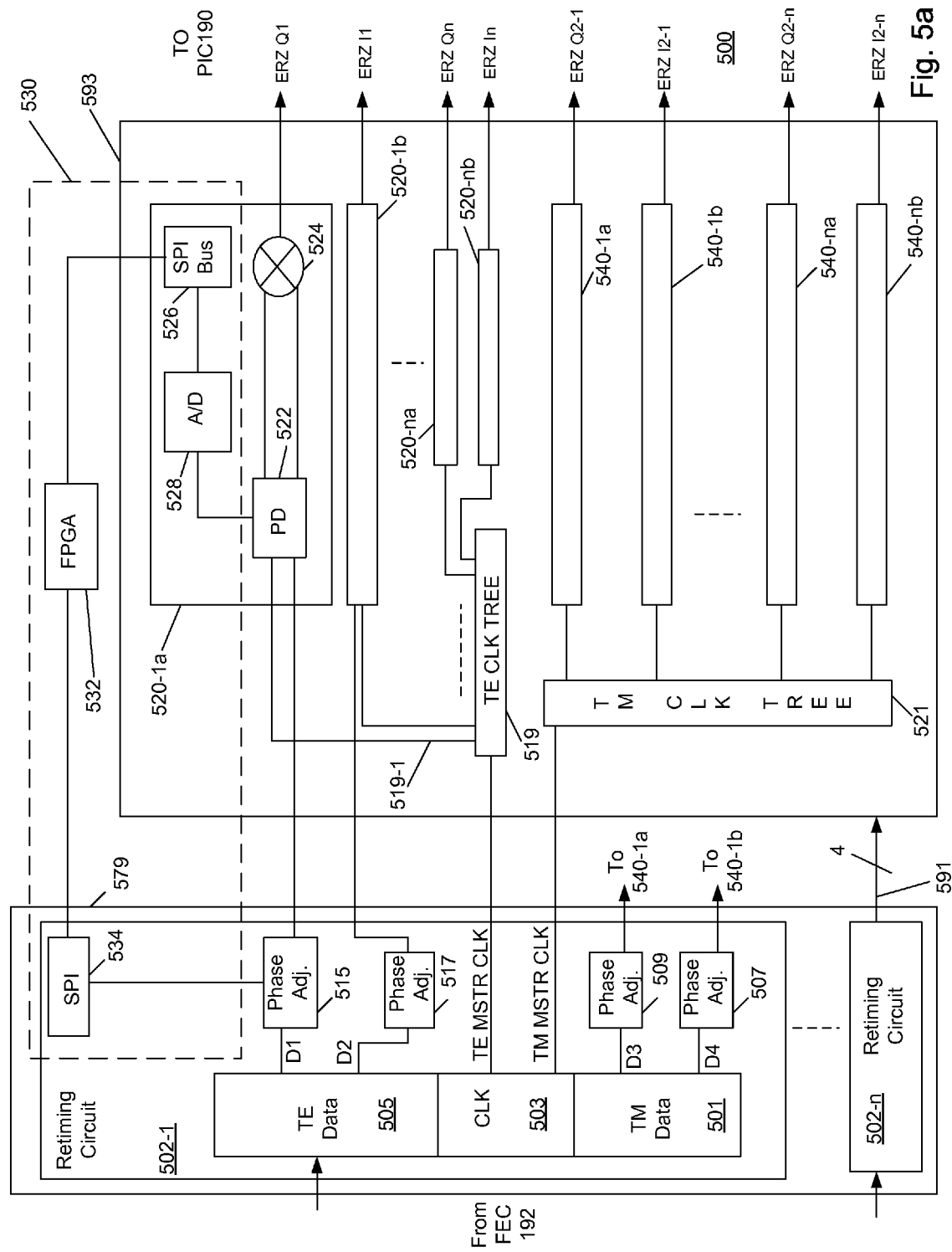
FIG. 5a illustrates an additional example of a driver circuit consistent with an aspect of the present disclosure.

FIG. 5*a* illustrates a further example of a communication apparatus 500 consistent with an additional aspect of the present disclosure. Apparatus 500 includes a plurality Retiming circuits 502-1 to **502-*n*, each of which receiving encoded data, for example, from a corresponding one of FEC encoder circuits 192-1 to 192-*m*. Retiming circuit 502-1 is shown in greater detail than remaining retiming circuits 502-2 to 502-*n*, but it is understood that retiming circuits 502-2 to 502-*n* have the same or similar structure as CDR circuit 502-1 and operate in the same or similar manner as retiming circuit 502-1**.

Retiming circuit 502-1 includes sections 505, 503, and 501 for supplying data associated with TE polarized light at a given wavelength (e.g., X1) output from PIC 190 (NRZ data signals D1 and D2), clocks signals TE MSTR CLK and TM MSTR CLK, and data associated with TM polarized light at the given wavelength (NRZ data signals D3 and D4). Data signal D1 is supplied to a known phase adjusting circuit 515 which adjusts the phase of the data signal, and clock signal TE MSTR CLK is supplied to clock tree 519 (TE CLK TREE). Clock tree 519, in turn, distributes clock signals to drive circuits 520-1*a* to **520-*na* and 520-1***b* to **520-*nb* for generating ERZ drive signals (ERZQ1 to ERZQn and ERZI1 to ERZIn) that are fed to the modulators on PIC 190** that modulate TE polarized light.

For example, clock tree 519 distributes clock signal TE MSTR CLK to a known phase detector 522 on output 519-1. Phase detector 522 also receives, as an input, data signal D1, and senses a phase difference or timing difference between signal D1 and TE MSTR CLK. TE MSTR CLK and signal D1 are output from phase detector 522 and fed to multiplier circuit 524, which multiplies TE MSTR CLK by D1 to generate ERZ signal ERZQ1.

As noted above, in generating an ERZ signal, the timing between the clock signal and the NRZ data signal, which is multiplied by the clock signal, should preferably controlled to within a relatively narrow margin. If not, a pulse may transition to a low or zero level midway through a bit period, for example, instead at the beginning and end of the bit period. As a result, errors may occur. A mechanism for regulating the timing of the clock signal (TE MSTR CLK) and the data signal will be further described below.

Namely, as further shown in FIG. 5*a*, phase detector 522 is coupled to feedback circuit 530 and generates a sense signal in accordance with the phase difference between clock signal TE MSTRCLK and D1. The sense signal is provided to a feedback circuit 530, which includes analog-to-digital (ND) converter circuit 528 that supplies a digital signal in response to or corresponding to the sense signal. A/D converter circuit 528 is coupled to a field programmable gate array (FPGA) memory 532 via a known serial peripheral interface (SPI) bus 526, such that, in response to the digital signal, FPGA memory 532 outputs one of a plurality of digital phase values stored therein. For example, the digital signal may constitute a memory address, which identifies a location within FPGA memory 532 where a desired one of the plurality of digital phase values is stored. The output digital phase value from FPGA 532 is next supplied to SPI bus 534, which, in turn, supplies a control signals to phase adjusting circuit 515. Based on the received control signal, phase adjusting circuit 515 adjusts the phase of signal D1 to have a desired phase difference or timing relative to TE MSTR CLK. A plurality of FPGA may be provided, each of which receiving a respective digital signal and supplying a corresponding one of a plurality of control signals to phase adjusting circuits in retiming circuits 502-1 to 502-n.

Although not shown in FIG. 5a for ease of illustration, phase detectors that are similar to or the same as phase detector 522 may be provided in each of driver circuits 520-1b to 520-nb to sense the phase difference between incoming data signal, such as D2, and clock signal TE MSTR CLK. The same or similar feedback circuitry as circuit 530 may also be provided to receive the sense signal and supply corresponding control signals to phase adjusting circuit 517, as well as corresponding phase adjusting circuits in retiming circuits 502-2 to 502-n. The drive circuits, which receive the phase adjusted drive signals, in turn, output appropriately timed ERZ signals ERZI1 to ERZIn and ERZQ2 to ERZQn, which are output to corresponding modulators on PIC 190 that modulate optical signals output from PIC 190 with a TE polarization.

As further shown in FIG. 5a, portion 501 of retiming circuit 502-1 supplies NRZ data signals D3 and D4 to driver circuits 540-1a and 540-1b, via phase adjusting circuits 509 and 507, respectively, to modulate those optical signals carried by the given wavelength noted above, e.g., λ1, and having a TM polarization. Phase adjusting circuits 507 and 509 are coupled to one or more feedback circuits, as discussed below, to adjust the phase associated with signals D3 and 4. Driver circuits 540-1a and 540-1b have the same or similar structure as driver circuit 520-1a and operate in the same or similar manner as driver circuit 520-1a to output ERZ drive signals ERZQ2-1 and ERZI2-1, corresponding to ERZQ2 and ERZI2 discussed above.

Portion 503 of retiming circuit 502-1 may output clock signal TM MSTR CLK, which is distributed by clock tree 521 to each of driver circuits 540-1a to 540-1n and 540-1b to 540-nb. Other retiming circuits 502-2 to 502-n have the same or similar structure as the retiming circuit 502-1 and supply phase adjusted NRZ data signals to driver circuits 540-2a to 540-na and driver circuits 540-2b to 540-nb, via phase adjusting circuits, such as phase adjusting circuits 507 and 509. These driver circuits have the same or similar structure as driver circuit 520-1a, for example, and generate a corresponding one of ERZ drive signals ERZQ2-2 to ERZQ2-n and ERZI2-2 to ERZ I2-n. These drive signals are supplied to corresponding modulators in PIC 190 for modulating those optical signals output from PIC 190 having a TM polarization.

Preferably driver circuits and 520-1a to 520-na and 520-1b to 520-nb (collectively, "driver circuits 520"); and 540-1a to 540-na and 540-1b to 540-nb (collectively, "driver circuits 540"), as well as the phase detectors associated therewith are provided on substrate 593 along with clock tree circuits 519 and 521. In addition, retiming circuits 502-1 to 502-n are provided on substrate 579. Alternatively, retiming circuits 502-1 to 502-n may be housed separately. Moreover, each of driver circuits 520 and driver circuits 540 may be provided may be housed separately or provided on separate substrates.

Although one feedback circuit 530 is shown in FIG. 5a, it is understood that additional feedback circuits having a structure similar to or the same as feedback circuit 530 may be provided to sense the phase differences between that of the clock and data signals, adjust the phase imparted by phase adjusting circuits 517, 509, and 507 associated with retiming circuit 502-1, as well as the phase imparted by phase adjusting circuits included in remaining retiming circuits 502-2 to 502-n.

Figure 5B:
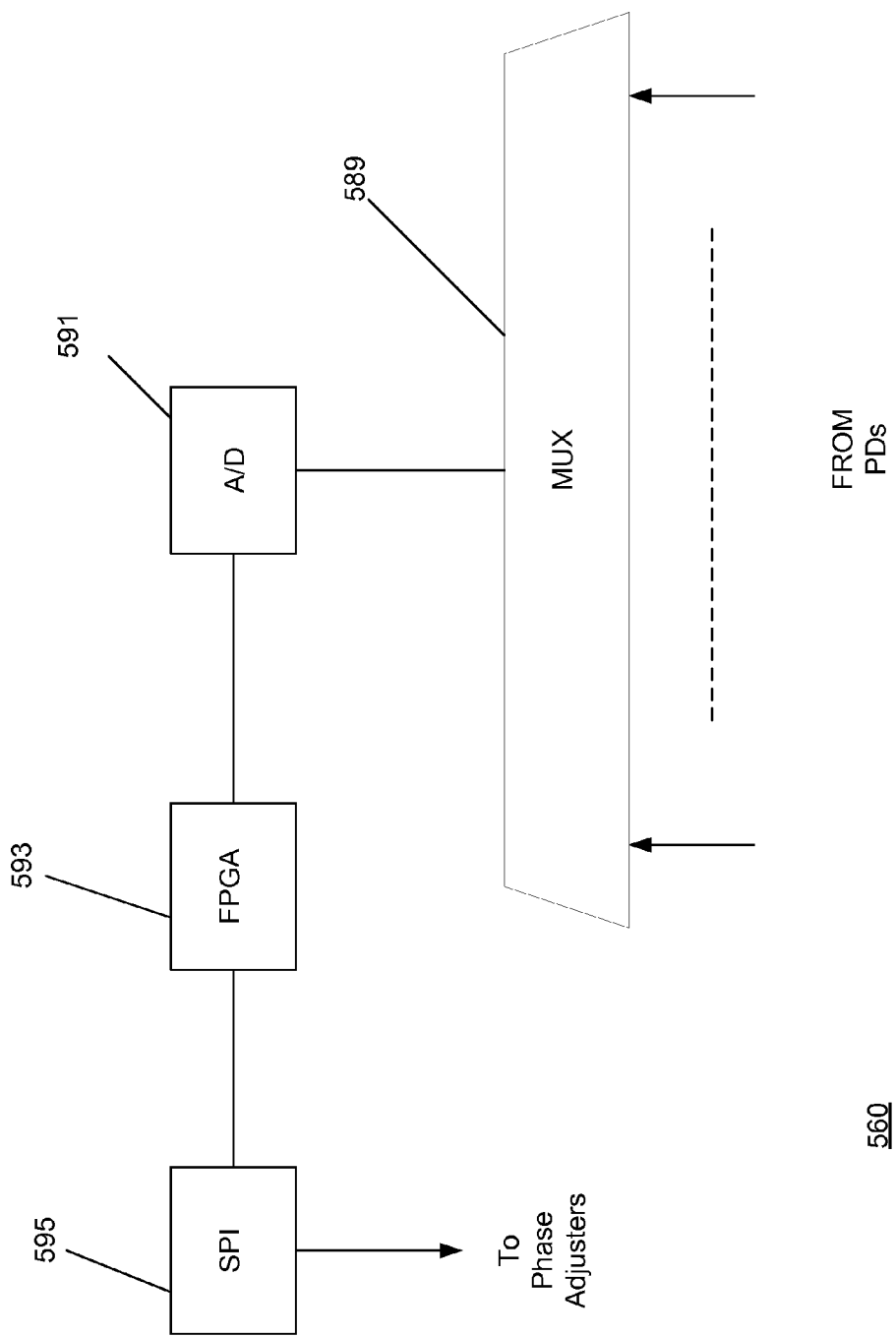

FIG. 5b illustrates an alternative feedback circuit 560 consistent with a further aspect of the present disclosure. Feedback circuit 560 includes a multiplexer 589 (preferably an analog multiplexer), that receives sense signals from the phase detector circuits included in each of driver circuits 520-1a to 520-na, 520-1b to 520-nb, 540-1a to 540-na, and 540-1b to 540-nb (e.g., PD 522). Multiplexer 589 selectively supplies one such sense signal at a time to analog-to-digital (ND) conversion circuit 591, which may be the same or similar to ND conversion circuit 528. ND conversion circuit 591, in turn, supplies a digital signal in response to or corresponding to the sense signal. In a manner similar to that described above, ND converter circuit 591 is coupled to a field programmable gate array (FPGA) memory 593, such that, in response to the digital signal, FPGA memory 593 outputs one of a plurality of digital phase values stored therein. For example, the digital signal may constitute a memory address, which identifies a location within FPGA memory 593 where a desired one of the plurality of digital phase values is stored. The output digital phase value from FPGA 532 is next supplied to SPI bus 595, which, in turn, supplies a control signals to a corresponding one of the phase adjusting circuits included in one of retiming circuits 502-1 to 502-n, e.g., phase adjusting circuit. Based on the received control signal, the selected phase adjusting circuit phase of the data signal supplied thereto to have a desired phase difference or timing relative to TE MSTR CLK or TM MSTR CLK.

As noted above, feedback circuitry may be provided to control the phase or timing of the data signal relative to the clock signal so that relatively error-free ERZ drive signals may be generated. Accordingly, CDR circuitry is not required to generate precisely timed clock signals on the same substrate as the driver circuits, as in the example discussed above in connection with FIG. 4. In addition, clock tree circuits 519 and 521 are provided on substrate 579, additional off-substrate clock signal lines are not required, thereby minimizing cross-talk and simplifying design of the driver circuitry.

Figure 6:
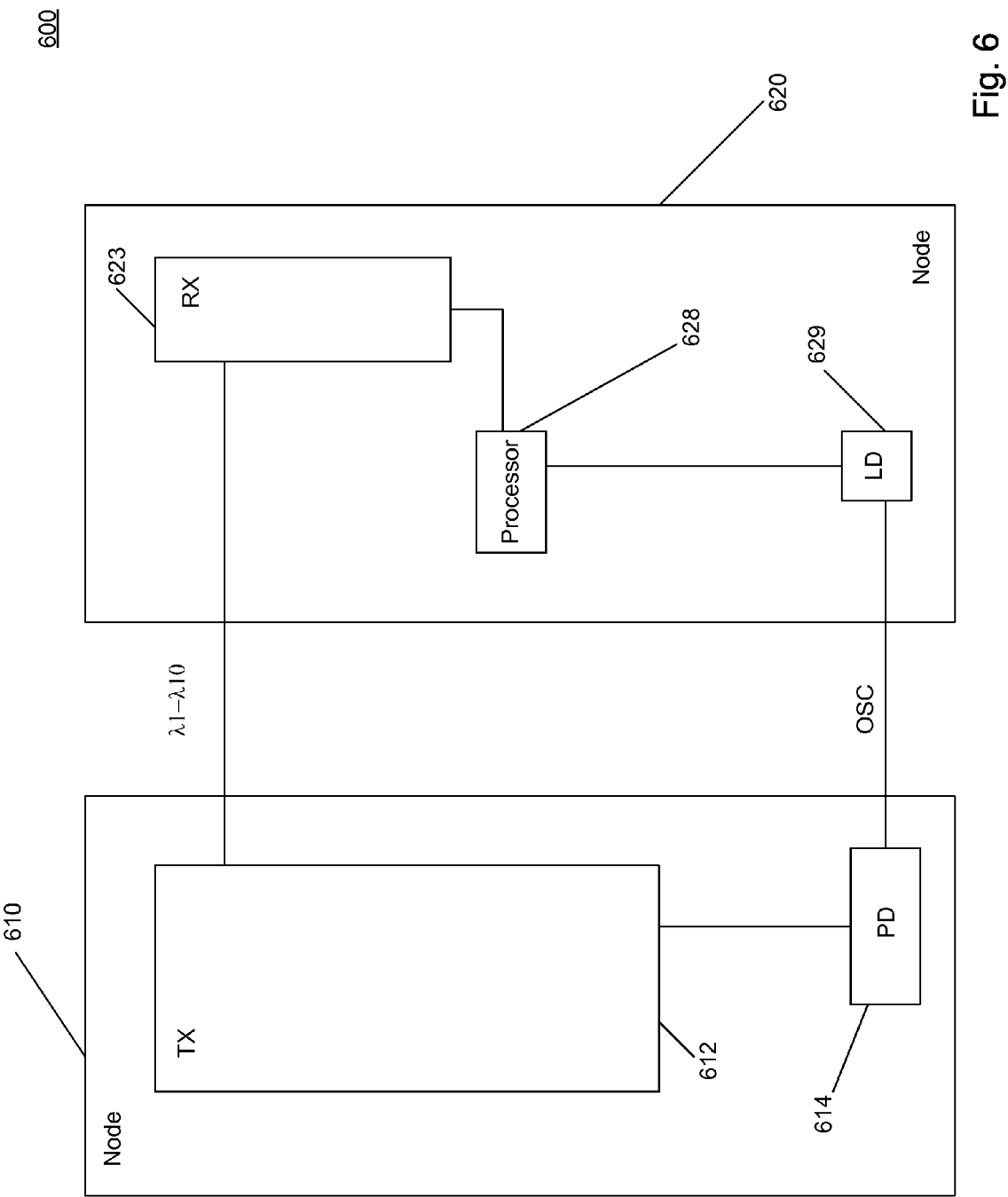
FIG. 6 illustrates a block diagram of an example of a communication system consistent with the present disclosure.

FIG. 6 illustrates a block diagram of a communication system 600 consistent with an additional aspect of the present disclosure. Communication system 600 includes a transmit node 610, which itself includes a transmitter 612, which outputs a plurality of optical signals, each of which having a corresponding one of wavelengths λ1 to λ10. The optical signals are transmitted to a receiver circuit 624 623 in a downstream or receive node 620.

As further shown in FIG. 6, processor 628 is coupled to one or more components within receiver circuit 624 and receives information output from receiver circuit 624 concerning bit error rates, signal-to-noise ratios, or other performance metrics or properties associated with the transmitted optical signals. Based on such information, processor 628 may determine or calculate timing or phase data that improves system performance. Such data may be encoded or carried by an electrical signal that is supplied to an optical service channel (OSC) emitter, such as laser diode 629, which, in turn, supplies OSC that is transmitted back to node 610 over an optical path that is separate or the same as the optical path that carried optical signals λ1 to λ10. An OSC receiver is provided in node 610 that includes for example, photodiode 614, which converts the additional OSC to a corresponding electrical signal that is output to transmitter 612.

FIG. 7 illustrates an example of a portion of transmitter 612, which includes a communication apparatus 700 similar to communication apparatus 500 shown in FIG. 5. Communication apparatus 700, however, differs from communication apparatus 500 in that feedback circuitry (e.g., feedback circuit 530) and associated components, such as phase detector circuits (e.g., phase detector circuit 522), are omitted in communication apparatus 700. Instead, as shown in FIG. 7, photodiode 614 is coupled to control circuit 710, such that the electrical signal output from photodiode 614 is supplied to control circuit 710. Control circuit 710, which is coupled to phase adjusting circuit 515, in turn, generates a control signal which is supplied to phase adjusting 515 to adjust the phase of NRZ data signal D1. Control signals may also be supplied to phase adjusting circuits 517, 509, and 507 to adjust the phase of NRZ data signals D2, D3, and D4, respectively, and further control signals may be provided to other phase adjusting circuits in retiming circuits 502-2 to 502-n to adjust the phase of the NRZ data signals output therefrom.

As noted above, the operation and structure of communication apparatus 700 is similar to that described above in connection with communication apparatus 500. For example, driver circuit 520-1a and other driver circuits 520 and 540 receive phase adjusted NRZ data signal multiply these signals by clock signals to output ERZ drive signals (ERZQ1 to ERZQn, ERZI1 to ERZIn, ERZQ2-1 to ERZQ2-n, and ERZI2-1 to ERZ I2-n) to PIC 190.

The communication system shown in FIGS. 6 and 7 may be advantageous if tuning of the timing or phase between the clock and NRZ data signal is desired. For example, upon system startup, the information carried by the OSC signal transmitted from receiver node 624 to transmitter node 610 may be used to adjust the phase of the NRZ data signals so that an optimized timing relative to the clock signal can be obtained, thereby yielding ERZ drive signals that are used to generate modulated optical signals having fewer errors.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A communication apparatus, comprising:
a phase detector configured to receive an input signal and a clock signal, the phase detector being configured to sense a difference in a phase of the input signal and a phase of the clock signal, the phase detector outputting a sense signal in accordance with the difference in the phase of the input signal and the phase of the clock signal;
a phase adjusting circuit configured to adjust the phase of the input signal in accordance with a control signal that is based on the sense signal; and
a multiplier circuit configured to multiply the input signal by the clock signal to generate an output signal.

2. A communication apparatus in accordance with claim 1, wherein the input signal is an electrical having non-return-to-zero (NRZ) pulse shape and the output signal is an electrical signal having a return-to-zero (RZ) pulse shape.

3. A communication apparatus in accordance with claim 1, further including a feedback circuit, the feedback circuit coupled to the phase detector, the feedback circuit receiving the sense signal and supplying the control signal.

4. A communication apparatus in accordance with claim 3, wherein the feedback circuit includes:
an analog-to-digital (ND) converter circuit coupled to the phase detector circuit and configured to supply a digital signal in response to the sense signal;
a memory coupled to the ND converter circuit, the memory storing a plurality of digital phase values and outputting one of the digital phase values in response to the digital signal, the memory supplying the control signal such that the control signal is indicative of the digital phase value.

5. A communication apparatus in accordance with claim 1, wherein the phase detector is one of a plurality of phase detectors, the multiplier circuit is one of a plurality of multiplier circuits, the output signal is one of a plurality of output signals, and the input signal is one of a plurality of input signals, each of the plurality of phase detectors receiving a corresponding one of the plurality of first input signals,
wherein the clock signal is distributed to each of the plurality of multiplier circuits such that each of the plurality of multiplier circuits multiplies a corresponding one of the plurality of input signals by the clock signal to generate a corresponding one of the plurality of output signals.

6. A communication apparatus in accordance with claim 5, wherein each of the plurality of input signals has non-return-to-zero (NRZ) pulse shape and each of the plurality of output signals has a return-to-zero (RZ) pulse shape.

7. A communication apparatus in accordance with claim 5, further including a clock tree circuit having a plurality of clock outputs, each of the plurality of clock outputs being coupled to a corresponding one of the plurality of phase detectors to supply the distributed clock signal to each of the plurality of phase detectors.

8. A communication apparatus in accordance with claim 7, wherein the clock tree circuit is a first clock tree circuit, and the clock signal is a first clock signal, the communication apparatus, further comprising:
a second clock tree circuit having a plurality of outputs;
a plurality of second phase detectors, each of the plurality of outputs of the second clock tree circuit being coupled to a corresponding one of the plurality of second phase detectors, such that a second clock signal is distributed by the second clock tree circuit to each of the plurality of second phase detectors.

9. A communication apparatus in accordance with claim 1, further including:
a substrate, the phase detector circuit and the multiplier circuit being provided on the substrate; and
a clock-and-data recovery (CDR) circuit that provides the input signal to the phase detector.

10. A communication apparatus in accordance with claim 9, further including a forward error correction (FEC) circuit that supplies an encoded data stream to the CDR circuit, the encoded data stream includes information associated with the input signal.

11. A communication apparatus in accordance with claim 1, further including a photonic integrated circuit that supplies a wavelength division multiplexed (WDM) signal including a plurality of optical signals, one of the plurality of optical signals being modulated, in part, in accordance with the output signal.

12. A communication apparatus in accordance with claim 11, wherein the output signal is an electrical signal having a return-to-zero (RZ) pulse shape.

* * * * *